Feb. 25, 1941.    H. N. FISHER    2,233,004
TIRE INNER TUBE
Filed April 5, 1939
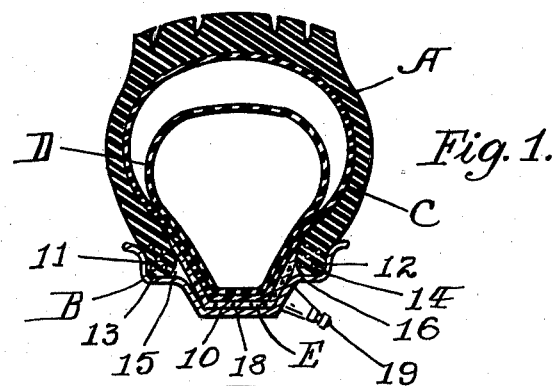
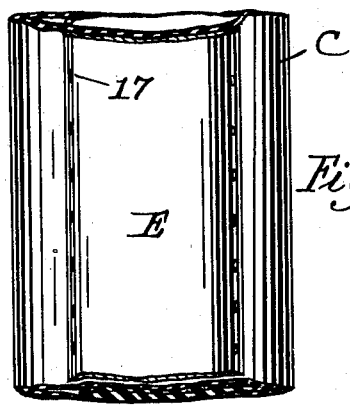
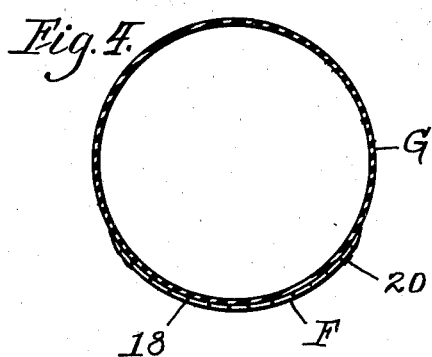
INVENTOR.
Howard N. Fisher.
BY
ATTORNEY.

Patented Feb. 25, 1941

2,233,004

UNITED STATES PATENT OFFICE 2,233,004

TIRE INNER TUBE

Howard N. Fisher, Los Angeles, Calif.

Application April 5, 1939, Serial No. 266,122

2 Claims. (Cl. 152—365)

My invention relates to improvements in inner tubes for tires and more particularly to means for protecting the inner tube from puncturing at or near the joints between the beads of the tire casing and the rim of a wheel on which the casing is mounted. With the type of wheel for automobiles now in general use the tire casing is formed with sides terminating in annular beads which are secured in grooves in the opposite annular side edges of the rim and the rim is formed with what is generally termed a full or semi-drop or flat base wheel rim. The inner tube of single or double safety type is placed in the casing and when inflated presses outwardly against the inner wall of the casing and the surface of the rim. It also tends to enter the joints between the beads of the casing and the rim. This tendency is augmented by the compression and lateral movement of the tire on the rim when in use. This action pinches and wears the tube at said joints and frequently causes the tube to perforate. This type of wear and puncturing is difficult to repair effectively and usually the tube is damaged beyond repair thus causing expense and delay. Also weakening of the tube from such wear tends to produce blowouts accompanied by fatalities.

In the accompanying drawing forming part of this specification, Fig. 1 is a typical cross section of an automobile tire and an inner tube therein of double safety type and showing my improvement applied thereto; Fig. 2 is a side elevation of a detail showing a portion of an inner tube of double safety type having my improvement applied thereto; Fig. 3 is a plan of the structure shown in Fig. 2, illustrating my improvement applied to the inner portion of the tube; and Fig. 4 is a typical cross section of an ordinary single tube showing my improvement applied thereto.

In the drawing, A indicates the casing of an automobile tire which is shown in Fig. 1 mounted upon a rim B of full drop center type, that is a rim having an annular central channel 10, terminating laterally in a pair of tire engaging annular channels 11 and 12 by which the beads 13 and 14 of the tire casing A are held on the wheel in the usual manner when the inner tube C is inflated. The inner tube C as shown in Fig. 1 is of double safety elastic type, that is it has a safety inner tube D which is adapted to function in the event the outer tube is punctured to temporarily support the load and prevent accidents from blow-outs. The outer inner tube C when inflated, conforms with the inner surface of the casing A and the portion of the rim B lying within the tire and tends to enter the joints 15 and 16 between the beads of the casing and rim. These joints eventually pinch and wear the tube until the tube punctures. This type of puncture and wear is difficult or impossible to repair effectively.

To overcome this difficulty I employ an inner protecting band E made out of rubber or other suitable material which conforms with and is secured to the outer tube by spot vulcanizing along its opposite edges at 17 (see Fig. 3). This protecting band is of sufficient width to cover the joints 15 and 16 and thus prevent pinching and wear at these places. The protector may be made out of rubber or any other suitable material and may be reinforced by webbing 18 embedded therein as shown in Fig. 4 when desired. Any other means for fastening the band to the tube may be employed within the spirit of the invention. The usual valve stem 19 is shown entering the inner tube and the protecting band. Also the type of rim employed may be varied and of any suitable construction.

In Fig. 4 the external protecting band F is shown applied and conforming with the inner surface of the inner portion of a single inner tube G by spot vulcanizing at 20 as in the structure shown in Fig. 2. In this construction the supplemental band F is also of sufficient width to protect the tube from the joints between the beads of the casing and wheel rim.

By spot vulcanizing the band on the tube as shown the band is attached freely to the tube and allows freedom of action between their contacting surfaces which assists in preventing pinching and wear of the joints between the casing and wheel rim. My invention also contemplates applying the protecting band to any type of inner tire tube. Mounting of my improved inner tube in the casing of a tire is substantially the same as when an ordinary tube is employed.

I desire to have it understood that the structure shown is only illustrative and that the invention can be carried out by other means and applied to uses other than those above set forth within the scope of the following claims.

I claim:

1. An inner tube for tires having a circular protecting elastic flap loosely attached to its inner periphery and substantially equally expansible longitudinally and transversely with said tube, said flap extending transversely sufficiently to bridge the space between the toes of the shoes of the tire, cover the joints between the toes of the shoes and the rim of the wheel, and protect the tube from wear therebetween.

2. In a structure as defined in claim 1, the edges of said flap being attached to the tube by spot vulcanizing at intervals circumferentially, whereby free movement is afforded between the flap and tube.

HOWARD N. FISHER.